United States Patent [19]

Seita et al.

[11] 4,189,361

[45] Feb. 19, 1980

[54] ELECTROLYSIS OF SODIUM CHLORIDE

[75] Inventors: Toru Seita; Takao Satoh; Akihiko Shimizu, all of Shin-nanyo, Japan

[73] Assignee: Toyo Soda Manufacturing Co., Ltd., Yamaguchi, Japan

[21] Appl. No.: 962,991

[22] Filed: Nov. 22, 1978

[30] Foreign Application Priority Data

Dec. 14, 1977 [JP] Japan ................................ 52-149338

[51] Int. Cl.$^2$ .......................... C25B 1/16; C25B 1/26; C25B 13/04; C25B 13/08
[52] U.S. Cl. ...................................... 204/98; 204/128; 204/296
[58] Field of Search .......................... 204/296, 98, 128

[56] References Cited

U.S. PATENT DOCUMENTS 4,026,783   5/1977   Grot ...................................... 204/296

*Primary Examiner*—R. L. Andrews
*Attorney, Agent, or Firm*—Oblon, Fisher, Spivak, McClelland & Maier

[57] ABSTRACT

An electrolysis of sodium chloride is carried out by using a cation exchange membrane obtained by the following treatment.

The cation exchange membrane is prepared by treating one surface of a membrane of a perfluorocarbon polymer having sulfonyl halide groups with a diamine or a polyamine at a temperature of 170° C. to a deterioration temperature of the membrane and immersing a diene derivative having a carboxyl group or a group which can be converted to carboxyl group into the membrane to polymerize the diene derivative and treating the membrane with a water miscible organic solvent having a boiling point of higher than 120° C. in 760 mmHg between smooth plates at 80° C. to 180° C.

9 Claims, No Drawings

ELECTROLYSIS OF SODIUM CHLORIDE

BACKGROUND OF THE INVENTION

The present invention relates to an electrolysis of sodium chloride by using a cation exchange membrane having excellent characteristics as a membrane for an electrolysis to produce sodium hydroxide in a cathode compartment and to produce chlorine in an anode compartment.

A diaphragm method has been known to produce sodium hydroxide under partitioning the anode compartment and the cathode compartment with a diaphragm.

In the diaphragm method, a diaphragm having high water permeability as an asbestos diaphragm is used. In order to prevent the reverse diffusion of OH ions from a cathode compartment to an anode compartment, an electrolysis is carried out under passing an aqueous solution of sodium chloride from the anode compartment to the cathode compartment. Accordingly, a large amount of sodium chloride is included in an aqueous solution of sodium hydroxide in the cathode compartment and a concentration of sodium hydroxide is low.

On the other hand, when an electrolysis of sodium chloride is carried by using a cation exchange membrane and feeding an aqueous solution of sodium chloride to the anode compartment, the diffusion of OH ions from the cathode compartment to the anode compartment can be effectively prevented and the movement of sodium chloride from the anode compartment to the cathode compartment can be substantially prevented in principal whereby sodium hydroxide having high purity can be produced in high current efficiency and the concentration of sodium hydroxide in a cathode compartment is increased in comparison with that of the conventional diaphragm method, advantageously. However, in a practice, it has not been found to obtain a cation exchange membrane which satisfactorily prevents the permeation of OH ions and is durable in severe conditions in the electrolytic cell.

SUMMARY OF THE INVENTION

It is an object of the present invention to provide an electrolysis of sodium chloride under satisfactorily preventing a permeation of OH ions, to produce sodium hydroxide having high purity in high current efficiency and low cell voltage.

The foregoing and other objects of the present invention have been attained by using a cation exchange membrane prepared by treating one surface of a membrane of a perfluorocarbon polymer having sulfonyl halide groups on branched chains, with a diamine or a polyamine and heating the treated polymer membrane at a temperature from 170° C. to a deterioration temperature of the membrane if necessary, hydrolyzing it and immersing a diene derivative having a carboxyl group or a group which can be converted to carboxyl group into the membrane to polymerize partially the diene derivative, and dipping the membrane into an organic solvent which is water miscible and has a boiling point of higher than 120° C. in 760 mmHg and holding the treated membrane between smooth plates and heating the membrane at 80° to 180° C. and, if the diene derivative having a group which can be converted to carboxyl group is used, converting said groups into carboxyl groups.

DETAILED DESCRIPTION OF THE PREFERRED EMBODIMENTS

As shown in the following References to Examples, the cation exchange membrane used in the present invention should be prepared by treating one surface of a membrane of a perfluorocarbon polymer having sulfonyl halide groups on branched chains, with a diamine or a polyamine and heating the treated polymer membrane at a temperature from 170° C. to a deterioration temperature of the membrane, if necessary, hydrolyzing it. The effect of the present invention is attained by using such modified cation exchange membrane.

Suitable fluorinated polymers having sulfonyl halide groups include the polymers having the following units.

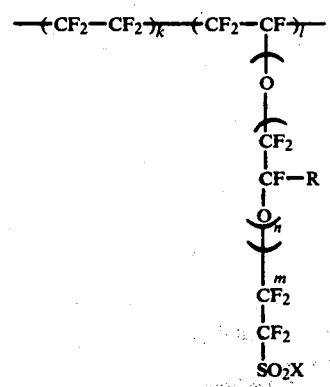

$R = -CF_3, -CF_2-O-CF_3;$ $n = 0$ or $1 \sim 5$;

$m = 0$ or $1$;

$k/l = 3-16$ preferable $5-13$ $X = F$ or $Cl$ especially,

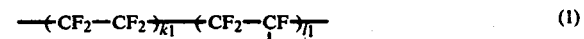

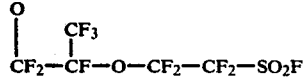 (1)

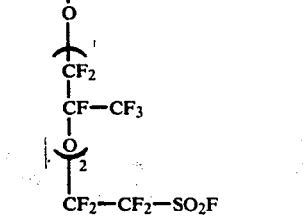 (2)

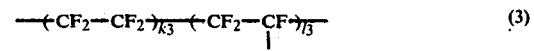

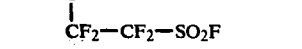 (3)

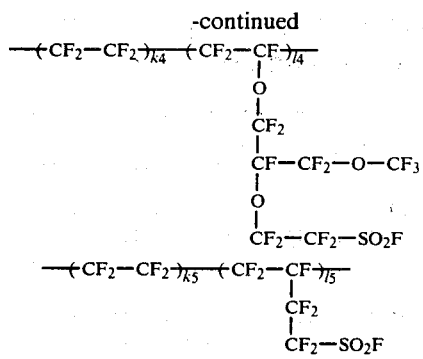

It is preferable to use the copolymer having 700 to 2800 g of a weight of the resin per 1 equivalent of sulfonyl halide group (hereinafter referring to as EW=700 to 2800 etc.), preferably EW=1000 to 1500.

The optimum copolymers have the units having the formula (1).

It is also possible to use a membrane prepared by fabricating the copolymer having the structure to form a membrane and reinforcing the membrane with a polytetrafluoroethylene fabric etc. in order to improve the mechanical property.

The fluorinated polymer having said units is used for fabricating into a membrane and the diamine or polyamine is reacted with one surface of the membrane.

The diamine or polyamine has at least amino groups including one primary amino group and another primary or secondary amino group.

Suitable diamines and polyamines include ethylenediamine, 1,2-diaminopropane, 1,3-diaminopropane, 1,6-diaminohexane, triethylenetetramine and tetraethylenepentamine.

A thickness of the layer formed by the reaction of the diamine or polyamine is usually in a range of 0.01 to 80% preferably 0.1 to 30% to the total thickness.

The reacted membrane is heated at 170° C. to the deterioration temperature of the polymer and preferably in a range of 190° to 300° C.

The resulting membrane can be hydrolyzed to obtain the modified cation exchange membrane.

Suitable diene derivatives used for the polymerization under the immersing, include (1) conjugated and non-conjugated dienes having carboxylic group such as

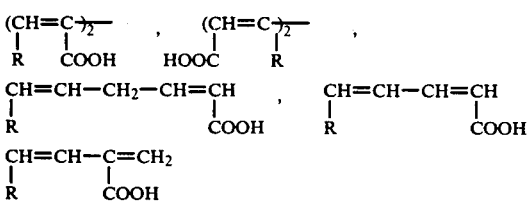

wherein R represents hydrogen atom, a halogen atom, carboxylic group or a $C_1$-$C_5$ alkyl group;

(2) conjugated or non-conjugated dienes having a group which can be converted to carboxylic group by a hydrolysis etc. such as

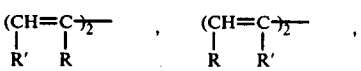

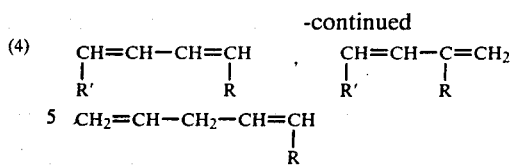

wherein R represents COCl, CN, CONHR″, COOR″ and R″ represents a $C_1$-$C_5$ alkyl group and R′ represents hydrogen or a halogen atom or a $C_1$-$C_5$ alkyl group.

The membrane of the perfluorocarbon polymer can be a membrane treated before immersing the diene derivative in the following conditions.

(1) A condition that the membrane is swollen with an organic solvent and the solvent is removed from the swollen membrane.

(2) A condition that the membrane is swollen with an organic solvent and the swollen membrane is heat-treated.

(3) A condition of no treatment of (1) or (2).

The organic solvent used for swelling the membrane of the perfluorocarbon polymer can be solvents having a water solubility of higher than 0.1 g/100 g $H_2O$ at room temperature and a boiling point of 30° to 100° C. in 760 mmHg and preferably solvents which rapidly swells a membrane and which are easily removed from the membrane after the treatment from the viewpoint of shorter treating time and easy processing after the treatment.

Suitable solvents include aliphatic monohydric alcohols such as methanol, ethanol and propanol; ketones such as acetone and methyl ethylketone; esters such as methyl acetate and ethyl acetates; ethers such as ethyl ether, propyl ether and tetrahydrofuran; and chloroform. It is possible to combine two or more kinds of the solvents.

In the condition (2), the membrane is swollen with the same organic solvent before the heat-treatment.

The heat-treatments include a method of treating the swollen membrane in a hot air; and a method of heating the swollen membrane under holding the membrane between smooth plates such as glass plate, polytetrafluoroethylene plate and stainless steel plate.

The heat-treatment is carried out in a range of 60° to 120° C. for 30 minutes to 30 hours.

The temperature for the immersing of the diene derivative into one of the three kinds of the cation exchange membranes is in a range of 0° to 100° C. preferably 20° to 80° C. The time for immersing is in a range of 5 minutes to 5 days.

In the immersing of the diene derivative into the membrane, suitable solvent can be used.

Suitable solvents combined with the diene derivative include aliphatic monohydric alcohols such as methanol and ethanol; ketones such as acetone, methylethyl ketone and diethyl ketone; esters such as methyl acetate and ethyl acetate; ethers such as ethyl ether, propyl ether, tetrahydrofuran and dioxane; and chloroform. It is possible to combine the solvents.

The partial polymerization after the immersing can be performed by a radical polymerization for polymerizing in the presence of a radical initiator such as azobisisobutyronitrile; a photopolymerization with a photosensitizer such as benzophenon, a heat polymerization and a radiation of high energy rays such as γ-rays and electron beams.

The temperature for the partial polymerization is in a range of 40° to 150° C. and the time for the partial polymerization is in a range of 5 minutes to 10 hours.

The partially polymerized cation exchanged membrane is treated by immersing in an organic solvent and heating it.

The organic solvents used in the treatment are solvent having a water solubility of higher than 0.1 g/100 g $H_2O$ at room temperature and a boiling point of higher than 120° C. in 760 mmHg.

Suitable organic solvents include ethyleneglycol, propyleneglycol, isopropyleneglycol, and butanediols such as 2,3-butanediol; pentanediols such as 1,5-pentanediols; hexanediols such as 1,6-hexanediol and glycerin. It is possible to combine two or more organic solvents.

The immersing treatment is carried out by dipping the cation exchange membrane in said organic solvent. The immersing time is dependent upon the kind of the organic solvent and can be in a range of 2 hours to 30 hours. Of course, the organic solvent can be heated below a boiling point of the organic solvent.

The heating treatment is carried out by holding the cation exchange membrane between smooth plates and heating it at 80° to 180° C. for 30 minutes to 30 hours.

The smooth plate can be a glass plate, a stainless plate, a polytetrafluoroethylene plate etc. When the diene derivative shown in (2) is used as the monomer, the functional groups are converted to carboxylic groups by hydrolysis etc.

The cation exchange membrane used in the present invention usually has a thickness of 0.05 mm to 1.5 mm. The thickness of the cation exchange membrane is selected depending upon a specific conductivity and a current efficiency of the cation exchanger membrane, so as to use it as a membrane for an electrolysis of an aqueous solution of sodium chloride.

The cation exchange membrane obtained by the process of the present invention is used to face the surface treated by the diamine or the polyamine to a cathode.

The electrolysis of the present invention is carried out by using an electrolytic cell equipped with an anode, a cathode, the cation exchange membrane treated by the above-mentioned treatment which is used for partitioning the cell to an anode compartment and a cathode compartment and an electric equipment for feeding current between the anode and the cathode and the electrolysis is carried out by feeding an aqueous solution of sodium chloride into the anode compartment of the cell and if necessary, feeding water into the cathode compartment so as to control a concentration of sodium hydroxide.

The temperature in the electrolysis is usually in a range of room temperature to 100° C., preferably 50° to 95° C.

The current density is usually in a range of 5 to 50 $A/dm^2$ and it is not advantageous to perform the electrolysis in a current density of higher than 50 $A/dm^2$ since the cell voltage is remarkably high.

As it is the same with the conventional electrolysis of an aqueous solution of sodium chloride, a purified aqueous solution of sodium chloride is fed to the anode compartment. It is preferable to use an aqueous solution from which magnesium and calcium components are removed. A concentration of an aqueous solution of sodium chloride is preferably high concentration especially near saturated concentration, and it is in a range of 250 g/liter to 350 g/liter.

The cathode is made of iron, stainless steel or iron coated with nickel or nickel compound.

The anode is titanium net coated with platinum or a noble metal oxide such as rhuthenium oxide. When electrodes having high accuracy of size are used, a gap between the electrodes can be decreased to about several mm whereby a potential drop between the electrodes can be minimized and a power consumption can be decreased. In order to prevent a contact between the cation exchange membrane and the electrode, it is possible to use suitable spacer.

The invention will be further illustrated by certain examples which are provided for purposes of illustration only and are not intended to be limiting in any manner.

EXAMPLE 1

A membrane made of a copolymer of $CF_2=CF_2$ and

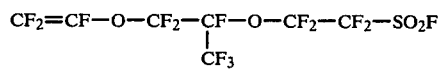

(EW=1100 and thickness of 7 mil) was used. Ethylenediamine was contacted with one surface of the membrane and then, the surface was washed and dried. According to a coloring test of a sectional part of the membrane, it was found to react it in a depth of 1.1 mil.

The membrane was reinforced with polytetrafluoroethylene fabric in the non-treated side by a heat bonding and it was heated at 180° to 200° C. and hydrolyzed to obtain a cation exchange membrane. The cation exchange membrane (I) in acid type was used. (In the other examples, this membrane was used.)

Then, an ether solution of butadiene-1-carboxylic acid (20 wt. %) was prepared and the membrane was immersed in the solution at room temperature for 2 days. The membrane was taken out and the surfaces were wiped off and the membrane was held between glass plates and heated at 110° C. for 2 hours to polymerize partially the monomer. Then, the membrane was immersed in ethyleneglycol for 7 hours and the membrane was held between smooth plates made of a glass plate, a rubber plate and a polyester sheet and heated at 110° C. for 6 hours and immersed into 0.5 N-NaOH for 2 days.

An electrytic cell having effective area of 30×30 $cm^2$ was prepared by partitioning an anode compartment and a cathode compartment with the resulting cation exchange membrane (the treated surface was faced to the cathode side). An electrolysis was carried out by feeding an aqueous solution of sodium chloride having a concentration of 300 g/liter into the anode compartment at a rate of 2600 cc/hour and feeding water into the cathode compartment so as to maintain 20 wt. % of the concentration of sodium hydroxide and passing current 270 amp.

In the normal operation, a current efficiency for sodium hydroxide obtained from the cathode compartment was 95% and a cell voltage was 3.7 volt. On the other hand, when the non-treated cation exchange membrane was used, a current efficiency was 88% and a cell voltage was 3.9 volt.

Reference 1

In accordance with the process of Example 1, the cation exchange membrane (I) was immersed in the solution of butadiene-1-carboxylic acid and the membrane was held between glass plates and heated at 110° C. for 8 hours to polymerize the monomer.

In accordance with the process of Example 1 except using the resulting cation exchange membrane, an electrolysis of an aqueous solution of sodium chloride was carried out. A current efficiency was 92% and a cell voltage was 4.2 volt.

Reference 2

In accordance with the process of Example 1 except using methanol instead of ethyleneglycol, a cation exchange membrane was prepared and an electrolysis of an aqueous solution of sodium chloride was carried out. A current efficiency was 94% and a cell voltage was 4.1 volt.

EXAMPLES 2 TO 6

In accordance with the process of Example 1 except using various organic solvents instead of ethyleneglycol, each cation exchange membrane was prepared and each electrolysis of an aqueous solution of sodium chloride was carried out.

The results of the current efficiency and the cell voltage are shown in Table.

| Example | Organic Solvent | Current efficiency (%) | Cell voltage (volt) |
| --- | --- | --- | --- |
| 2 | propyleneglycol | 95 | 3.7 |
| 3 | isopropyleneglycol | 96 | 3.8 |
| 4 | 2,5-pentanediol | 95 | 3.7 |
| 5 | glycerin | 96 | 3.7 |
| 6 | propyleneglycol: glycerin = 1 : 1 | 95 | 3.7 |

Reference 3

A cation exchange membrane (II) (EW=1100 and thickness of 7 mil) was prepared by reinforcing a membrane of a copolymer of

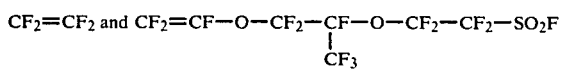

with polytetrafluoroethylene fabric by a heat bonding and hydrolyzing the copolymer.

In accordance with the process of Example 1, the cation exchange membrane (II) was treated with butadiene-1-carboxylic acid and ethyleneglycol and the electrolysis of an aqueous solution of sodium chloride was carried out by using the treated cation exchange membrane.

A current efficiency was 59% and a cell voltage was 3.3 volts.

The electrolysis was repeated by using the non-treated cation exchange membrane (II).

A current efficiency was 65% and a cell voltage was 3.3 volts.

EXAMPLE 7

The cation exchange membrane (I) of Example 1 was immersed in a solution of a diene derivative having the formula

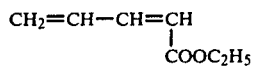

(50 wt. % methanol solution) at room temperature for 10 hours.

The membrane was taken out and the surfaces were wiped off and the membrane was held between glass plates and heated at 95° C. for 4 hours to polymerize the monomer and the membrane was immersed in propyleneglycol at room temperature for 10 hours and the membrane was held between smooth plates made of a glass plate, a rubber plate and a polyester sheet and heated at 130° C. for 5 hours and then, immersed it into 10 N-NaOH/methanol (1:1 by weight) to hydrolyze it whereby a cation exchange membrane was obtained.

In accordance with the process of Example 1 except using the resulting cation exchange membrane, an electrolysis of an aqueous solution of sodium chloride was carried out. A current efficiency was 95% and a cell voltage was 3.8 volts.

EXAMPLE 8

In accordance with the process of Example 7 except using a diene derivative having the formula

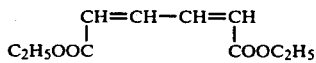

instead of

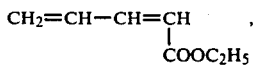

a cation exchange membrane was prepared and an electrolysis of an aqueous solution of sodium chloride was carried out. A current efficiency was 91% and a cell voltage was 3.5 volts.

EXAMPLE 9

The cation exchange membrane (I) of Example 1 was immersed in methanol for 10 hours and methanol was evaporated in vacuum. The resulting membrane was immersed in an ether solution of butadiene-1-carboxylic acid (25 wt. %) at room temperature for two days.

The membrane was taken out and the surfaces were wiped off and the membrane was held between glass plates and heated at 120° C. for 2 hours to polymerize partially the monomer. The membrane was immersed in propyleneglycol for 20 hours and the membrane was held between smooth plates made of a glass plate, a rubber plate and a polyester sheet and heated at 115° C. for 12 hours and immersed into 0.5 N-NaOH for 2 days.

An electrolytic cell having effective area of 30×30 cm² was prepared by partitioning an anode compartment and a cathode compartment with the resulting cation exchange membrane, (the treated surface was faced to the cathode side). An electrolysis was carried out by feeding an aqueous solution of sodium chloride having a concentration of 300 g/liter into the anode compartment at a rate of 3900 cc/hour and feeding water into the cathode compartment so as to maintain 30 wt. % of the concentration of sodium hydroxide and passing current of 270 amp.

In the normal operation, a current efficiency for sodium hydroxide obtained from the cathode compartment was 89% and a cell voltage was 3.8 volt. On the other hand, when the non-treated cation exchange membrane was used, a current efficiency was 72% and a cell voltage was 4.3 volt.

EXAMPLE 10

The cation exchange membrane (I) of Example 1 was immersed in ethanol for 10 hours and held between glass plates and heated at 100° C. for 8 hours and the membrane was treated by the process of Example 9.

In accordance with the process of Example 9 except using the treated cation exchange membrane, an electrolysis was carried out.

A current efficiency was 93% and a cell voltage was 4.0 volt.

What is claimed is:

1. In an electrolysis of sodium chloride by feeding an aqueous solution of sodium chloride into an anode compartment of an electrolytic cell having an ion exchange membrane, for partitioning the cell into an anode compartment and a cathode compartment, between the anode and the cathode, the improvement which comprises using a cation exchange membrane prepared by: treating one surface of a membrane of a perfluorocarbon polymer having sulfonyl halide groups on branched chains with a diamine or a polyamine; heating the treated polymer membrane at a temperature in the range of from 170° C. up to the deterioration temperature of the membrane; hydrolyzing the so-treated membrane; immersing the hydrolyzed membrane in a diene derivative having a carboxyl group or a group which can be converted to a carboxyl group; after immersion, partially polymerizing the diene derivative; dipping the membrane into an organic solvent which is water miscible and has a boiling point of higher than 120° C. at 760 mm Hg; holding the treated membrane between smooth plates and heating the membrane at a temperature in the range of from 80° to 180° C.; and converting any group on the diene derivative, which can be converted to a carboxyl group, into a carboxyl group.

2. An electrolysis according to claim 1, wherein prior to immersing the hydrolyzed membrane in said diene derivative, the hydrolyzed membrane is swollen in an organic solvent and the solvent is removed.

3. An electrolysis according to claim 1, wherein prior to immersing the hydrolyzed membrane in said diene derivative, the hydrolyzed membrane is swollen in an organic solvent and then heated while holding said membrane between smooth plates.

4. An electrolysis according to claim 2 or 3 wherein the organic solvent has a solubility in water of greater than 0.1 g/100 g $H_2O$ at room temperature and a boiling point of 30° to 100° C. at 760 mm Hg.

5. An electrolysis according to claim 3 wherein the heating treatment is carried out at 60° to 120° C.

6. An electrolysis according to claim 1 wherein the sulfonyl halide groups are sulfonyl fluoride groups or sulfonyl chloride groups.

7. An electrolysis according to claim 1 wherein the diene derivative having carboxyl group or a group which can be converted to carboxyl group is a conjugated diene derivative or a non-conjugated diene derivative.

8. An electrolysis according to claim 1 wherein the organic solvent having a boiling point of higher than 120° C. at 760 mmHg is selected from ethyleneglycol, propyleneglycol, isopropyleneglycol, butanediols, pentanediols, hexanediols and glycerin.

9. An electrolysis according to claim 1 wherein the surface treated with diamine or a polyamine is disposed to face a cathode.

* * * * *